Aug. 15, 1933. J. A. H. BARKEIJ 1,923,018

MULTICYLINDER INTERNAL COMBUSTION ENGINE

Filed Sept. 14, 1925

INVENTOR.

J A H Barkeij

Patented Aug. 15, 1933

1,923,018

UNITED STATES PATENT OFFICE 1,923,018

MULTICYLINDER INTERNAL COMBUSTION ENGINE

Jean A. H. Barkeij, Los Angeles, Calif., assignor to George C. Arvedson, New York, N. Y.

Application September 14, 1925
Serial No. 56,323

36 Claims. (Cl. 123—52)

My invention relates to arrangements of suction orders and inlet-manifolds in order to increase and equalize the volumetric efficiency of internal combustion engines using gaseous fuel or air. My primary object is to combine a suction order, in which the inertia of the gases is accumulative in the same direction, with such an inlet manifold system that the volumetric efficiency increases for all cylinders. In the basic arrangement shown in the Figures 10, and 11 all suction orders obtainable with a standard crankshaft, having crankpins 1 and 6, 2 and 5, 3 and 4 aligned at angles of 120°, can be employed. In the variations of Figs. 1, 2, 5, 6 half of the possible orders should be used. For the straight 8 cylinder however the basic arrangement of Figs. 10 and 11 can only be combined with certain suction orders of certain crankpin arrangements, which insure perfect balance of the reciprocating parts, connected to said crankpins. In one type all the suction orders compatible with the crankpin arrangement thereof, can be combined with the basic arrangement of Figs. 10 and 11.

In this straight eight type the cylinders corresponding to the crankpins, which are in one plane, for instance cylinder 1, 8, 4, 5 in Fig. 7, cylinders 1, 8, 3, 6 in Fig. 8, and cylinders 1, 7, 3, 5 in Fig. 9, should be connected with one manifold, and the cylinders corresponding with the crankpins in the other plane, for instance cylinders 3, 6, 2, 7 in Fig. 7, cylinders 4, 5, 2, 7 in Fig. 8, and cylinders 4, 6, 2, 8 in Fig. 9 should be connected with the other manifold. In this arrangement each group of four cylinders has overlapped suction periods, provided the suction periods start about at the top position of the corresponding piston and close substantially after the next bottom position of the same piston.

If in certain of these arrangements, for instance as shown in Fig. 11, it is desired to have four consecutive suctions to the right for cylinders 1, 3, 5, 7, and then four consecutive suctions to the left for cylinders 8, 6, 4, 2, it is evident that the crankpin arrangement of Fig. 9 would not do, but that those of Figs. 7, 8 would be satisfactory, as the suction order of Fig. 7 could be for instance 1, 7, 5, 3, 8, 2, 4, 6 and for Fig. 8 for instance 1, 5, 3, 7, 8, 4, 6, 2. They could not be alternative and continuously overlapping in the same direction for each group of four cylinders, as the crankpins in Figs. 7 and 8 are so arranged that crankpins 1, 3, 5, 7 are at 90° and crankpins 2, 4, 6, 8 at 90°. The crankpin arrangement of Fig. 9 allows only alternative suctions in the manifolds of Fig. 11.

Other crankpin arrangements for the straight eight, which are not shown here, can be made corresponding to the two manifolds-arrangement and reversely, retaining overlapping in the same direction. It is therefore evident that in the manifolds of Figs. 1, 2, 5, 6, respectively three or four suction periods go consecutively to the right and three or four to the left, and that in the manifolds of Figs. 10, 11 there may be three or four to the right during one revolution, and then three of four to the left during the next revolution, or they may alternate and still be in the same direction.

My second object is to provide an inlet manifold which is entirely straight for so far the inlet manifold is connected to the inlet openings of the cylinders.

My third object is to establish the above mentioned suction orders with crankshafts, of which the crankpins are so arranged that the reciprocating parts are inherently balanced as far as the primary and secondary inertia forces of the reciprocating parts attached to said crankpins are concerned.

My fourth object is to increase the volumetric efficiency of the cylinders especially at high speeds.

My fifth object is to have consecutive suction strokes or periods in nonadjacent cylinders, if the progressivity of consecutive strokes, as mentioned in my primary object, is not applied. The first and fifth objects may, however, be combined, as progressive consecutive suction strokes may be combined with consecutive suction strokes in nonadjacent cylinders.

Other objects and advantages will appear hereinafter and while I show herewith and will describe only preferred forms of construction, I desire it to be understood that I do not limit my invention to such preferred forms but that various changes and adaptations may be made therein, without departing from the spirit of my invention as hereinafter claimed.

Referring to the drawing, which accompanies this specification and forms a part thereof, Fig. 1 is a top view of the cylinders of a motor, showing inlet and exhaust valves, which are connected with a straight inlet manifold with a carburetor at each end thereof.

Figure 12:
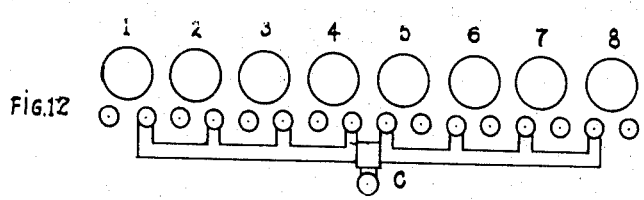

Fig. 12 shows a straight eight cylinder, in which a main manifold runs parallel to the cylinders with separate branches to the individual cylinders, having a carburator attached in the middle of said manifold. These individual branches are connected with the right inlet valves of cylinders 1, 2, 3, 4, and the left inlet valves of cylinders 5, 6, 7, 8 so that the two innermost valves are inlet valves. This arrangement combined with the crankpin arrangement of Fig. 13, producing a suction order 1, 4, 2, 3, 6, 7, 5, 8, will result in consecutive suction periods overlapping, in one direction for cylinders 1, 2, 3, 4, and for cylinders 5, 6, 7, 8.

Figure 13:
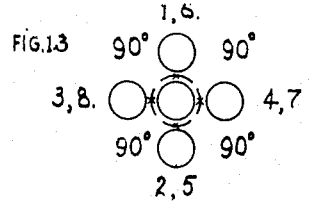

Fig. 13 shows a crank-pin arrangement suitable for the engine of Fig. 12.

In the drawing of Figs. 1, 2, 5, 6 a single straight or loop-manifold connects with all cylinders. The cylinders are numbered 1 to 6 or 8 inclusive. The inlet valves are numbered 1a to 6a or 8a inclusive, and the exhaust valves similarly 1b to 6b or 8b inclusive. The carburetors are indicated by the letter C. The crankpin arrangements are shown in Figs. 3, 4, 7, 8, 9. The first two figures show the standard arrangements and a sideview of these crankshafts is superfluous, for the purpose set forth in this application.

Figure 7:
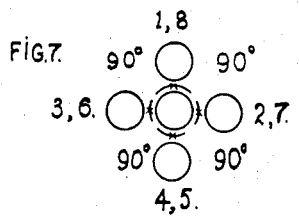
Figs. 7, 8, 9 show the arrangement of the crankpins of crankshafts for 8 cylinder motors, which allow inherent balance of the reciprocating parts.
Figure 8:
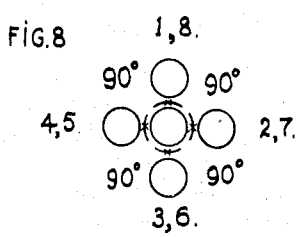
Figure 9:
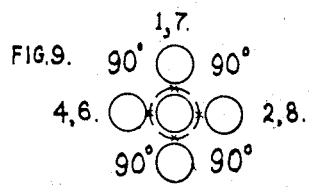

The arrangements of crankpins shown in Figs. 7, 8, 9 are already shown respectively in my application Ser. No. 711,446, filed May 6, 1924 and Ser. No. 58,445, Sept. 24, 1925. It is however considered superfluous to show them in sideview as the end view will not leave any doubt about their relative position and the suction orders which can be derived from said arrangements.

Figure 3:
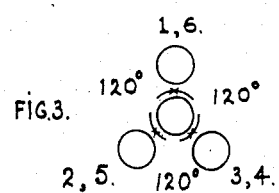
Figs. 3 and 4 show the arrangement of the crankpins of two standard six cylinder crankshafts, which secure inherent balance of the reciprocating parts.

The arrangement of crankpins shown in Fig. 3 allows the following consecutive progressive suction orders for a group of 3 cylinders, if rotating in a clockwise direction, 1, 2, 3, 6, 5, 4 or 1, 2, 4, 6, 5, 3 and their reverse orders 3, 2, 1, 4, 5, 6 or 4, 2, 1, 3, 5, 6 if rotating in a counterclockwise direction. In a counterclockwise direction they may be 1, 3, 5, 6, 4, 2 or 1, 4, 5, 6, 3, 2, or their reverse orders, if rotation is reversed.

Figure 4:
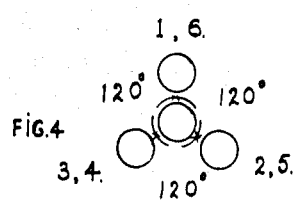

The arrangement of crankpins shown in Fig. 4 allows the same four orders and their reverse, if the rotation is reversed. The arrangement of crankpins shown in Fig. 7 allows in clockwise direction the following consecutive progressive suction orders, 1, 3, 5, 7, 8, 6, 4, 2 or 1, 3, 4, 7, 8, 6, 5, 2, or in counterclockwise direction the orders 1, 2, 5, 6, 8, 7, 4, 3 or 1, 2, 4, 6, 8, 7, 5, 3 and their reverse order if their rotation is reversed.

The arrangement of crankpins shown in Fig. 8 allows the following suction orders in clockwise direction 1 5, 6, 7, 8, 4, 3, 2 or 1, 4, 6, 7, 8, 5, 3, 2 and in counterclockwise direction 1, 2, 3, 5, 8, 7, 6, 4 or 1, 2, 3, 4, 8, 7, 6, 5 or their reverse orders if the rotation is reversed.

The arrangement of crankpins shown in Fig. 9 allows only one consecutive progressive suction order 1, 4, 5, 8, 7, 6, 3, 2 and its reverse. Considering the suction orders of the first nine figures, it is seen that the suction orders for a group of 3 or 4 cylinders overlap each other. For the six cylinder the period of overlapping is $225° - 120° = 105°$, for the 8 cylinder $225° - 90° = 135°$.

Figure 1:
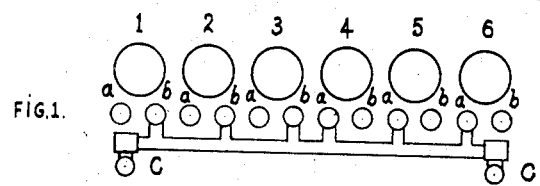
Figure 5:
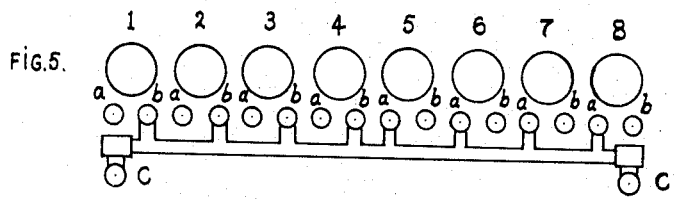
Fig. 5 is a top view of the same cylinders and valves for an 8 cylinder motor, with the same type of inlet manifold seen in Fig. 1.

The gases in the arrangement of Figs. 1 and 5 will continue in their direction during an entire revolution and will not come to a standstill as the suction strokes overlap each other. The carburetor C to the left being nearer to the cylinders 1, 2, 3 will deliver more gas to these cylinders when the suction order moves to the right in the order 1, 2, 3, 6, 5, 4. For the three other cylinders 6, 5, 4 the other carburetor will provide more gas. For the other suction orders mentioned the distribution of the gases from the two carburetors may be more mixed. In every case however the two carburetors tend to create a balance in the gases and will do this, even if the suction order is as in standard cars, 1, 5, 3, 6, 2, 4 in which the suction orders go back and forth without any progressivity.

In that case, the order of the suction strokes in the various cylinders should be so that two or three consecutive strokes do not take place in adjacent cylinders. In a six cylinder the suction order 1, 2, 3, 6, 5, 4 is not advisable from an explosion standpoint, if a single block of 6 cylinders is used. However this progressive order may be applied on an engine, having more than one bank of six cylinders, arranged radially, so that consecutive strokes in one half of one block are compensated with strokes in opposite direction in another block. In a straight eight cylinder, conditions are somewhat different. Again the suction order 1, 3, 5, 7, 8, 6, 4, 2 should not be used on a single bank of eight cylinders. The order 1, 2, 5, 6, 8, 7, 4, 3 (see for both orders the crankpin arrangement of Fig. 7) has also consecutive strokes in four pairs of adjacent cylinders and is therefore somewhat superior to said first order, though inferior to the order 1, 7, 4, 6, 8, 2, 5, 3. Between cylinders 1 and 2 there is in the last order an interval of 270°, between cylinders 2 and 3 only an interval of 180° (in which they overlap), between cylinders 3 and 4 again an interval of 270°. Therefore it is better to speak of consecutive suction strokes or periods in nonadjacent cylinders than of overlapping strokes or periods in nonadjacent cylinders, as in the eight cylinder nonconsecutive strokes may overlap and in the six cylinder nonconsecutive strokes do not overlap, unless the suction period is longer than 240°.

Figure 2:
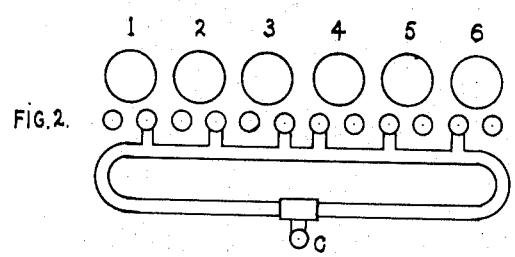
Fig. 2 is a top view of the same six cylinders and 12 valves, but the ends of the inlet manifold are bent towards a single carburetor forming more or less a loop.
Figure 6:
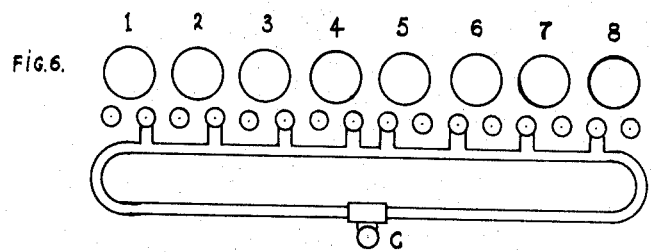
Fig. 6 shows the same top view of the cylinders and valves for an 8 cylinder motor, with the same type of inlet manifold shown in Fig. 2.

In the arrangement of Figs. 2 and 6 the action is different as the gases are provided by a single carburetor. The pulsations in opposite direction near the distributing zone above the carburetor react on the pulsations in the straight inlet manifold along the cylinder group. To decrease these pulsations to a minimum it is especially preferred to use the progressive suction orders enumerated for this arrangement of the inlet manifold and fuel mixing means. The volumetric efficiency of a motor depends upon different factors as rate of flow, skin friction (wall friction), temperature, lift and area of valves etc. It is the purpose of this invention to increase the volumetric efficiency by reducing eddying and bending effects, by decreasing the loss of head on account of the constant direction of the flow of gases. The arrangement with two carburetors shown in Figs. 1 and 5 has the advantage of a short, straight manifold, but the loop arrangement shown in Figs. 2 and 6 has the advantage of a single carburetor.

Figure 10:
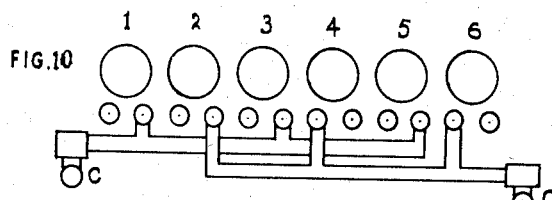
Figs. 10 and 11 show two separate inlet manifolds for a six and 8 cylinder motor.

The present standard arrangement for 6 cylinder motors has a carburetor in the middle of an inlet manifold extending in opposite direction to the right and left group of cylinders as shown in Fig. 12 for an eight cylinder. For the manifold and carburetor arrangement of Fig. 12, the crankpins 1, 2, 3, 4 and crankpins 5, 6, 7, 8 are at 180°, so that the suction periods alternate perfectly to the right and to the left, if those two groups of crankpins are aligned in four pairs at 90°, in said order, as explained in my Patent No. 1,787,186 of Dec. 30, 1930. If the manifold of Fig. 12, however, is combined with the crankpin arrangement of Fig. 13, the suction periods are not alternative to the right and to the left, as for instance in a suction order 1, 4, 2, 3, 6, 7, 5, 8 as explained in the same patent. However, the suctions would be overlapping in the same direction for cylinders 4, 3, 2, 1 during one revolution and for cylinders 5, 6, 7, 8 during the next revolution. The gases will be at least "dead" in each branch between suctions in cylinders belonging to the right or left group of cylinders. If for a six cylinder the suction periods are 240° or shorter and the suction order is 1, 5, 3, 6, 2, 4; and if for an eight cylinder the crankpins 1, 2, 3, 4 are at 90° instead of in one plane, and crankpins 5, 6, 7, 8 are at 90°, instead of in one plane. If the crankpins in a straight eight are so arranged that crankpins 1, 2, 3, 4 are in one plane, and crankpins 5, 6, 7, 8 in the other plane perpendicular to said first plane, the suctions have to go alternatively to the right and to the left, and overlap each other in the same direction, if the suctions begin about the top position of the corresponding piston and end substantially after bottom position of said same piston. In an eight cylinder the suctions may overlap for each group of four cylinders, if the suction period of each cylinder is greater than 180°, but in either type the suctions are one or more times in opposite direction in the zone of distribution for the left and right group of cylinders. These suctions in opposite directions decrease the volumetric efficiency of all the cylinders. Considering the Figures 10 and 11, it is seen, that two separate inlet manifolds are used, one for each group of 3 or 4 cylinders in which the direction of the flow of gases is progressive. This arrangement can be made suitable to any progressive suction order. On account of the separate inlet manifolds, each attached only to those cylinders which have a progressive suction order in one direction, the gases in each manifold will stream at any time in the same direction. The two manifolds are shown connected each with a single carburetor. In Fig. 10 with a suction order 1, 3, 2, 6, 4, 5, the suctions are consecutive and in the same direction overlapping, if the suction periods are 121° or greater. With a suction order 1, 5, 3, 6, 2, 4 they are alternative in the two manifolds, but the suction periods 1, 3, 2 are in the same direction nevertheless and will be overlapping, if the length of the suction periods is 241° or greater. Any suction order compatible with the only two crankpin arrangements, which give perfect balance for the reciprocating parts of a straight six, will cause progressivity provided the suction periods are 241°.

Figure 11:
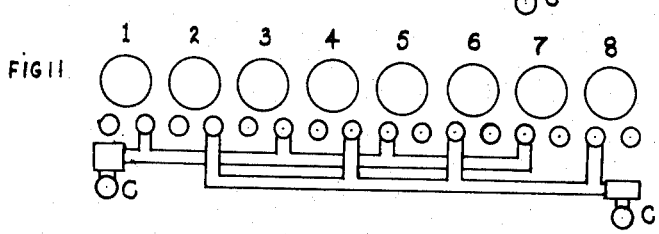

In Fig. 11 the crankpin arrangement of Figs. 7 and 8 for instance, (and any other, in which crankpins 1, 2, 3, 4 are at 90° and crankpins 5, 6, 7, 8 are at 90°, coinciding and aligned with those of the first named four crankpins) only two of the suction orders, respectively for Fig. 7, 1, 7, 5, 3, 8, 2, 4, 6 and 1, 3, 5, 7, 8, 6, 4, 2 and suction orders 1, 7, 3, 5, 8, 2, 6, 4 and 1, 5, 3, 7, 8, 4, 6, 2 for Fig. 8 would cause progressivity with consecutive suctions with intervals of about 90° in each of the two manifolds. Fig. 11 combined with the crankpin arrangement of Fig. 9 would cause progressivity with intervals of about 180° in each of said manifolds, as the suctions have to be alternative in these two manifolds. If the two manifolds are reversed in their direction (the suction order has to be reversed of course at the same time) the two manifolds can be easier connected with a single carburetor with two inlet openings and two jets, thereby making possible a single float chamber. The principles of this application will be equally incorporated in such an arrangement.

Finally the progressive suction orders in a single straight six or eight are not all equally good considered from a standpoint of equal distribution of the successive explosions over the entire length of the motor. Besides it might be advisable to avoid the overlapping of two explosion strokes in two adjacent cylinders with respect to the load created in the respective bearings. A progressive suction order of 1, 3, 5, 6, 4, 2 is probably superior to the other progressive suction orders for the sixes and the progressive suction order 1, 3, 5, 7, 8, 6, 4, 2 superior to the others mentioned. In these orders the suctions are consecutive for each group of cylinders 1, 3, 5 and 2, 4, 6 each connected to one manifold. If a non-consecutive progressive suction order is adopted, like the standard firing order 1, 5, 3, 6, 2, 4 the cylinders 1, 3, 2 are in one group with one inlet manifold, cylinders 2, 4, 6 in the other group with another manifold. The suctions are now not consecutive for cylinders 1, 2, 3 and for the other group 2, 4, 6, and do not overlap, if the suction period of each cylinder is less than 240°, which is generally the case. If they are 241° or longer they will be overlapping in each manifold, though the suctions are alternative in the two manifolds. If the suction order 1, 2, 3, 6, 5, 4 were used in the latter group-arrangement the suctions for each group would be overlapping even if the suction periods were only 121° in length.

The arrangements proposed in Figs. 1, 2, 5, 6 for 6 and 8 cylinders prevent standstill of gases entirely and retain at the same time progressivity. All arrangements shown propose a straight manifold in one plane for the entire length of that part of the manifold that leads along the engine towards its respective cylinders to reduce the friction to a minimum and to equalize the friction for the suction period of each cylinder. It is understood that the proposed arrangements are equally applicable to sleeve valve engines.

The cross-section of the manifold may be triangular, square or round. The conduits from the main straight inlet manifold can be constructed to siamesed inlet openings as shown in my application No. 58,445. The latter construction shows a smaller number of edges on account of the smaller number of zones where the main inlet manifold enters the individual conduits to the cylinders, especially when square tubing is used.

Supercharging for the proposed arrangement of fuel mixing means and inlet manifolding will of course involve two supercharging elements for the Figures 1, 5, 10 and 11, unless the blower is connected with two different exit conduits to the two ends of the manifold, but without a zone of distribution; otherwise the arrangement of Figs. 2 and 6 would be imitated.

This supercharging has effects inherent to this particular arrangement of manifolding and suction order, but not inherent to the supercharging.

It is understood that the same arrangement of manifolding may be used on engines not provided with carburetors, like Diesel engines, in which the proper and equal volumetric efficiency is at least of equal importance.

The cylinders may be placed in a row longitudinally or may be placed in a row radially.

It is further understood that the advantages of this proposed method of gas distribution will be equally obtained, if only one carbureter is used at the end of the main conduit shown in Fig. 1 and 5, like it is shown for the double manifolds of Figs. 10 and 11.

It is further claimed also, that even if the suction periods for the six cylinders of Figs. 1 and 3 are 1, 5, 3, 6, 4, 2, and for the 8 cylinders of Figs. 5 and 7 are 1, 7, 4, 6, 8, 2, 5, 3, that advantages of equal distribution are obtained, if not advantages of high volumetric efficiency. In these suction orders the suction for one half of the cylinders is not progressive any more, but the successive suctions take place in cylinders which are not adjacent. This latter fact seems to be a dominating factor in the equilibrium of gases obtained by such an arrangement of the carbureter at one end or both ends of a main conduit, as a suction order 1, 2, 3, 6, 5, 4 or 1, 3, 2, 6, 4, 5 in which half of the adjacent cylinders have successive overlapping (or overlapping and progressive) suction orders will more result in high volumetric efficiency of all the cylinders. The explanation of this latter phenomenon is probably this, that in the suction order 1, 5, 3, 6, 4, 2, the reversal of the direction of suction takes place at points in the main manifold further removed from each other than in the two latter suction orders 1, 2, 3, 6, 5, 4 and 1, 3, 2, 6, 4, 5. The same phenomenon appears for the eight cylinder if the suction order is made (conform the last two for the six cylinder) 1, 3, 4, 2, 8, 6, 5, 7 or 1, 2, 4, 3, 8, 7, 5, 6 (see Fig. 7), which would be wrong orders. And again the same results are obtained for the eight cylinder, combined with the crankpin arrangements of Figs. 8 and 9. For these latter arrangements the right suction orders are again resp. 1, 7, 3, 5, 8, 2, 6, 4 and 1, 8, 3, 6, 7, 2, 5, 4. The suction orders 1, 2, 3, 4, 8, 7, 6, 5 or 1, 2, 3, 4, 7, 8, 5, 6 are in this second method positively wrong as four adjacent cylinders would have overlapping suction periods (strokes). Equally a suction order 1, 2, 6, 5, 8, 7, 3, 4 for Fig. 8 and 1, 2, 5, 6, 7, 8, 3, 4 for Fig. 9, would be inferior to the first two mentioned orders, though a little superior to the next two mentioned orders, as in the latter orders four adjacent cylinders at the time have overlapping suction strokes, and in the last two orders four sets of two adjacent cylinders have overlapping suction strokes.

Finally the latter feature the successive overlapping suction strokes in nonadjacent cylinders, as shown in Figs. 1, 3, 5, 6 may be or rather is of more importance than the progressive suction order in one direction during one revolution and in opposite direction during the next revolution. This latter fact is of special importance in radial engines, in which the suction order is always only one, if equal intervals in firing are desired in an engine with an equal number of cylinders. For a five cylinder, it is well known, that the firing or suction order must be 1, 3, 5, 2, 4, and in a seven, nine and 11 cylinder, radial type, resp. 1, 3, 5, 7, 2, 4, 6; 1, 3, 5, 7, 9, 2, 4, 6, 8; 1, 3, 5, 7, 9, 11, 2, 4, 6, 8, 10.

Equally in such an arrangement the carbureters may be attached only at one end or both ends of the main conduit.

It is further evident, that if all the cylinders of any type of engine with cylinders, arranged in a row or radially, have siamesed inlet openings for two adjacent cylinders, that if the overlapping successive suction strokes take place in two nonadjacent cylinders that the overlapping of these two successive strokes never can take place in siamesed inlet openings, as this siamesing is only possible for two adjacent cylinders.

It is also understood, that the eight cylinder engine of the straight type, may have other crankpin arrangements than the three shown, which are all well known in the art. Crankpins 1 and 4, may be opposite 2 and 3 in one plane, and crankpins 5 and 8 oposite 6 and 7 in the other plane. Equally crankpins 1 and 8 may be aligned opposite crankpins 2 and 7 in one plane, and crankpins 3 and 6 aligned opposite crankpins 4 and 5 in the other plane. And finally crankpins 1 and 6 may be opposite crankpins 2 and 5 in one plane, and crankpins 3 and 8 opposite crankpins 4 and 7 in the other plane, perpendicular to said first plane.

If only a single carburetor is used at one end of the main conduit and the suction strokes go back and forth in the main conduit, when the suction order is f.i. 1, 5, 3, 6, 2, 4 the pulsating action agitates and mixes the gasoline and air better than when a progressive order is chosen, like the order 1, 3, 5, 6, 4, 2 in which the pulsating action is less. The same condition obtains more or less if a carburetor is used at both ends of the main conduit, with said respective orders. Also the pulling power at low engine speeds is materially improved, especially for sleeve valve engines if only one carburetor is used at one end of the main conduit, compared with the old systems in which the carburetor is placed in the middle of the manifold.

It should be noted that in all figures the innermost valves of each pair of valves for each cylinder, is used as the inlet valve, which construction is of first importance, if the engine should be as short as possible, when it has to find room in a certain frame and body of very limited and definite proportions. This arrangement allows space for a carburetor at each end of the manifold, as shown in Figs. 1, 5, 10, and 11, so that the carburetors do not have to extend, or not appreciably, beyond the length of the engine itself. This arrangement results further in another appreciable advantage, so far as concerns the cooling of the valves and engineblock. It can be seen, that if said latter construction is applied, that the inlet and exhaust valves alternate in the cylinderblock and have to have separate inlet and exhaust branches, except for the innermost two valves, which are always inlet valves, if an equal number of cylinders in line are used. As already pointed out in application No. 101,715, April 13, 1926, in view of another method of gas distribution, this construction prevents two exhaust valves from being each others neighbour, so that local overheating on account of the close adjacency of the cylinders, is prevented especially in an L-head construction, in which all the valves are substantially in one row besides the cylinders. No separate water passages have to be constructed in the cylinderblock to cool these spots in the cylinderblock more efficiently, and at the same time obtain the aforesaid advantage of the location of the carburetors.

It is, of course, understood, that these latter two advantages are independent of the advantage of the progressive suctions, preferred in general, and in addition to these latter two advantages. In certain cases a certain crankpin arrangement would not lend itself very easy to the last general advantage of obtaining high or volumetric efficiency, but yet could incorporate very easy the latter two advantages. My patent No. 1,776,760, Fig. 35, and 27-36 are of importance in connection with said latter two advantages especially.

If said inlet valves are not placed so that the innermost two valves are inlet valves, the reduction of the friction in the construction of Figs. 1, 5, 10, 11, 12 holds good, and the right angle construction of every branch to each separate inlet valve of each cylinder still has the advantage of remixing the heavier parts of the gasoline in the mixture stream on account of the sharp angles between branches and main, straight, inlet manifold. This advantage is, of course, independent of the progressivity of the suction order, and is located in the particular construction of the manifold itself.

It is further not superfluous to point out, that the inlet periods being about 225° long, start about at top position and close about 45° after bottom position, or even later than that up to about 70° after bottom position. The inlet valve, however, may open before the respective piston attains top position or after said top position, independent of the fact whether the corresponding exhaust valve of each respective cylinder closes before or after top-position, which latter arrangement is the preferred one to take advantage of the kinetic energy of the outgoing gases.

The gas distribution system of the Figures 9 and 11 is represented again in the same, plus in a modified, form in my application of Nov. 16, 1925, Ser. No. 69,431, now Patent No. 1,809,923 June 16, 1931. Both of said modified forms may be applied upon any crankpin arrangement of the eight cylinder motor, having cylinders substantially in line, as shown in my Patent 1,776,760 of Sept. 23, 1930 (application 152,708 of Dec. 4, 1926).

I claim:

1. The combination in an internal combustion engine of a plurality of cylinders, said cylinders connected by individual branches to a single main conduit, said main conduit connected at each end with fuel mixing means, progressive suction periods from one end thereof and in retrogressive direction from the other end thereof during a single revolution of said engine and in reverse direction for the next revolution.

2. The combination in an internal combustion engine of a plurality of cylinders, said cylinders connected with two or more conduits to a main conduit at points intermediate the ends of said main conduit, said ends exposed to atmospheric pressure, said cylinders, which are not adjacent to each other, having progressive suction periods during one revolution of said engine.

3. The combination in an internal combustion engine of at least six cylinders, said cylinders connected by individual branches to a single main conduit, progressive suction periods from one end of said main conduit, which overlap each other during one revolution of said engine, progressive suction periods from the other end thereof, which overlap each other during the next revolution of said engine, said main conduit connected at each end with fuel mixing means.

4. In an internal combustion engine the combination of at least six cylinders in a straight line, said cylinders connected by individual branches to a main conduit, having at least one carburetor attached thereto at one end thereof, one half of said cylinders, which being not adjacent to each other having progressive consecutive suction periods during one revolution in one direction, the other half of nonadjacent cylinders having progressive and consecutive suction periods during the next revolution in opposite direction.

5. In an internal combustion engine the method of distributing a mixture to a plurality of cylinders, which consists of subjecting said mixture to overlapping progressive suction periods from one end of said engine during one revolution, and to overlapping progressive suction periods from the other end thereof during the next revolution and in reverse direction.

6. In an internal combustion engine, the method of distributing a gas to a plurality of cylinders in line, which consists of subjecting said gas to overlapping progressive suction periods during one revolution in one direction to nonadjacent cylinders, and to overlapping progressive suction periods in reverse direction to nonadjacent cylinders during the next revolution.

7. In an internal combustion engine having at least 8 cylinders in a straight line, half of said cylinders connected with a single manifold, the other half of said cylinders with another manifold, each group of said cylinders having overlapping, progressive suction periods in one direction, at least one group of said cylinders composed of nonadjacent cylinders.

8. In an internal combustion engine having at least 8 cylinders, substantially in a straight line, said cylinders divided in two groups of half the cylinders, each group provided with fuel mixing means, each group having overlapping, progressive suction periods in one direction during one revolution, but those of one group being opposite in direction to those of the other group during one revolution and again opposite to each other in the next revolution.

9. The combination of claim 7, in which one group of cylinders use the left valve of each pair of valves for each cylinder as the inlet valve, the other group using the right valve of each pair of valves as the inlet valve, so that the carburetors attached to the end of said manifolds do not extend appreciably beyond the length of the engine.

10. The combination of the claim 1, combined with the following valve arrangement, in which each cylinder has a single exhaust and a single inlet valve, said valves arranged in line like said cylinders, the valve closest to the center of the engine being the inlet valve, so that the carburetors attached to the ends of said manifold do not extend outside the length of said engine.

11. The combination of claim 4 combined with the following inlet valve construction, in which the valves closest to a plane perpendicular to the crankshaft of said engine through the approximate middle or center of said engine, are the inlet valves, each cylinder having a single inlet and single exhaust valve, said construction leaving sufficient space for the carburetors, attached at the ends of said manifold so as not to extend appreciably outside the length of said engine.

12. The combination of claim 7, in which each half of said cylinders is composed of nonadjacent cylinders.

13. The combination of claim 7, in which each half of said cylinders is composed of nonadjacent cylinders, each half having said suction periods only during substantially one revolution.

14. In an internal combustion engine, the combination of at least six cylinders arranged in a straight line, said cylinders connected by branch ducts to a main inlet conduit, having at one end thereof fuel mixing means, one half of said cylinders, which are nonadjacent to each other, having overlapping successive suction periods only during one revolution of said engine, the other half of said cylinders, equally nonadjacent to each other, having also overlapping successive suction periods during the next revolution, said engine operating on a fourstroke cycle, said overlapping suction periods of said one group being progressive in one direction during one revolution of said engine, and also progressive during the next revolution for the said other group of cylinders, but in a direction opposite to the progressivity of said first group of cylinders.

15. The combination in an internal combustion engine, of a plurality of cylinders, at least six and a multiple of two, said cylinders connected to a single main and straight inlet conduit, said inlet conduit connected at its opposite ends with fuel mixing means, said cylinders having each a single exhaust and a single inlet valve, said valves so arranged that they alternate the exhaust with the inlet valve among each other, except the two innermost valves which are inlet valves, said arrangement leaving enough space at either end of said manifold to attach carburetors, which will not extend appreciably beyond the length of the engine.

16. An L-head internal combustion engine having at least four cylinders and a multiple of two arranged in line, having a pair of valves, an exhaust and inlet valve for each cylinder, and arranged substantially in line beside the cylinder, said valves alternating the exhaust valve with the inlet valve, except the two innermost valves which are inlet valves, a carburetor at each end of a straight manifold connected with said inlet valves so that the mixture may enter said inlet manifold without any appreciable curve, said valve arrangement allowing sufficient space for said two carburetors so that they will not extend appreciably beyond the length of said engine.

17. The combination in an internal combustion engine of the L-head mixture type, of a plurality of cylinders and a multiple of two, said cylinders arranged in line and connected by individual branches to a main inlet conduit, each of said individual branches exposed to atmospheric pressure from two sides where said branches connect with said main inlet conduit, said individual branches connected with said main conduit at points intermediate the ends thereof, said cylinders having each two valves, an exhaust and inlet valves, said types of valves alternating with each other, so that the two innermost valves are inlet valves, said construction resulting in better cooling of the cylinder block and allowing sufficient room for two carburetors at the two ends of said manifold so as not to extend appreciably beyond the length of said cylinder block, said engine applied on an automobile frame.

18. An internal combustion engine having a plurality of cylinders, and a multiple of two, each cylinder having only two valves, an exhaust and an inlet valve, on at least one side of said cylinders, said valves being arranged in line like said cylinders in an L-head formation, said valves alternating the exhaust valve with the inlet valve except the two innermost valves, which are inlet valves, said inlet valves connecting with manifolding and two carburetors so arranged, that they are located at the extreme ends of said engine connecting with the extreme ends of said inlet manifolding, so that said carburetors will not extend appreciably beyond the length of the engine.

19. An internal combustion engine having a plurality of cylinders at least six and a multiple of two in a block each cylinder having two valves, an exhaust and an inlet valve at one side of said cylinders, both in line beside each other, said exhaust and inlet valves alternating with each other except the two innermost inlet valves, inlet manifolding connecting with individual branches to said inlet valves, two carburetors at the extreme ends of said manifolding at the extreme ends of said cylinderblock, so that said carburetors do not extend appreciably beyond the length of said cylinderblock.

20. In an internal combustion engine of the straight type having at least six cylinders arranged in a straight line, each cylinder having a single exhaust and a single inlet valve and operating on the fourstroke cycle, all valves being located in a single plane, parallel to each other, said inlet and exhaust valves alternating with each other, so that the two innermost valves in said plane, which are adjacent to each other, are inlet valves; a single manifold connecting with all of said inlet valves, fuel mixing means associated with said inlet manifold.

21. In an internal combustion engine of the straight type having at least six cylinders arranged in a straight line, each cylinder having a single exhaust and a single inlet valve and operating on the fourstroke cycle, all valves being located in a single plane parallel to each other besides the cylinders in an L-head formation, said inlet and exhaust valves alternating with each other, so that the two innermost valves in said single plane are adjacent to each other and are inlet valves; a single inlet manifold associated with fuel mixing means connecting with all of said inlet valves individually with separate branches.

22. In an internal combustion engine of the fourstroke cycle type having at least 8 cylinders in a straight line, half of said cylinders which are not adjacent to each other having a single manifold and fuel mixing means and continuously overlapping suction periods, the other half of said cylinders, being nonadjacent having another manifold with fuel mixing means and continuously overlapping suction periods of about 225°, closing about 45° after the bottom position of the corresponding piston.

23. The combination of claim 22, in which the suction periods in each manifold are further progressive from the fuel mixing means to the cylinders.

24. In an internal combustion engine of the fourstroke cycle, having eight cylinders in line, having suction periods which start approximately when the corresponding piston is in top position and closing substantially after said piston has reached its bottom position, said suction periods having intervals of substantially 90°, said cylinders divided in two groups of four cylinders, each group having fuel mixing means and at least one group of four cylinders composed of nonadjacent cylinders in a row, each group of four cylinders having suction periods with an interval of about 180°, said latter suction periods overlapping each other substantially in each of said two groups of four cylinders.

25. The combination of claim 24, in which each group of four cylinders have suction periods in the same direction from said fuel mixing means to the respective cylinders of each group.

26. The combination of claim 24, in which each group of four cylinders have suction periods in the same direction during one revolution from said fuel mixing means to respective cylinders of each group.

27. The combination of claim 20, in which said manifold has a carburetor attached at the middle of said manifold, having an equal number of separate branches to the cylinders to the left and to the right thereof, each of said branches being perpendicular to said main manifold, parallel to the cylinderblock.

28. The combination of claim 21, in which a carburetor is attached to the middle of said manifold, so that an equal number of branches to the individual cylinders extend to the left and to the right of the zone of distribution in said manifold, to which said carburetor is attached, said branches being at right angles to said manifold which runs parallel to the cylinderblock.

29. In an internal combustion engine of the straight type having at least six cylinders and a multiple of two arranged in a straight line, each cylinder having a single exhaust and a single inlet valve operating on the fourstroke cycle, all said valves being located in a single plane, parallel to each other, said inlet valves connected by a separate branch to a main, straight, inlet conduit parallel to the cylinderblock, a carburetor at each end of said main conduit, said separate branches being substantially perpendicular to said main inlet manifold.

30. In an internal combustion engine of the fourstroke cycle, having eight cylinders substantially in a straight line, having suction periods which start when the corresponding piston is substantially in top position and closing substantially after said piston has reached its bottom position, said suction periods having intervals of substantially 90°, said cylinders divided in two groups of four non-adjacent cylinders, said cylinders in said two groups having separate fuel mixing means, each group of four cylinders having suction periods with an interval of substantially 180°, said latter suction periods overlapping each other substantially in each of said two groups of four nonadjacent cylinders.

31. The combination of claim 30, in which each group of four cylinders have suction periods in the same direction from said fuel mixing means to the respective cylinders of each group.

32. The combination of claim 30, in which each group of four cylinders have suction periods in the same direction during one revolution from said fuel mixing means to the respective cylinders of each group.

33. Intake manifolding for an engine having eight longitudinally arranged cylinders, said manifolding having branches for respectively conducting fuel mixture to two groups of four cylinders each, one group comprising cylinders 1, 3, 5, 7 and the other group comprising cylinders 2, 4, 6, 8, and means for supplying fuel mixture to said branches.

34. Intake manifolding for an engine having eight longitudinally arranged cylinders, said manifolding having branches for respectively conducting fuel mixture to two groups of four cylinders each, one group comprising cylinders 1, 3, 5, 7 and the other group comprising cylinders 2, 4, 6, 8, and means for separately carbureting said branches.

35. Intake manifolding for an engine having six longitudinally arranged cylinders, said manifolding having branches for respectively conducting fuel mixture to two groups of three cylinders each, one group comprising cylinders 1, 3, 5, and the other group comprising cylinders 2, 4, 6 and means for supplying fuel mixture to said branches.

36. Intake manifolding for an engine having six longitudinally arranged cylinders, said manifolding having branches for respectively conducting fuel mixture to two groups of three cylinders each, one group comprising cylinders 1, 3, 5, and the other group comprising cylinders 2, 4, 6 and means for separately carbureting said branches.

J. A. H. BARKEIJ.